United States Patent [19]

Udagawa

[11] Patent Number: 4,867,462

[45] Date of Patent: Sep. 19, 1989

[54] STEEL LAMINATE GASKET WITH SEPARATE BEADS

[75] Inventor: Tsunekazu Udagawa, Ichikawa, Japan

[73] Assignee: Ishikawa Gasket Co., Ltd., Tokyo, Japan

[21] Appl. No.: 316,359

[22] Filed: Feb. 27, 1989

Related U.S. Application Data

[63] Continuation-in-part of Ser. No. 194,377, May 16, 1988.

[51] Int. Cl.$^4$ ............................................. F16J 15/08
[52] U.S. Cl. ............................. 277/235 B; 277/213; 277/234; 277/236
[58] Field of Search ............... 277/166, 213, 233, 234, 277/235 R, 235 A, 235 B, 236

[56] References Cited

U.S. PATENT DOCUMENTS 1,851,948  3/1932  Summers .................. 277/235 B
4,619,459  10/1986  Herrington ................. 277/233
4,676,515  6/1987  Cobb ........................ 277/235 B
4,728,110  3/1988  Nakasone ................... 277/234
4,767,124  8/1988  Udagawa .................. 277/235 B Primary Examiner—Robert S. Ward
Attorney, Agent, or Firm—Kanesaka and Takeuchi

[57] ABSTRACT

A steel laminate gasket of the invention is used for an internal combustion engine having at least one hole therein. The gasket comprises a first plate having at least one first hole and a first bead situated adjacent to the first hole to surround the same, and a second plate situated adjacent to the first plate. The second plate is provided with at least one second hole, at least one second bead situated adjacent to the second hole to surround the same, and at least one third bead situated at a predetermined distance away from the second bead. When the first and second plates are assembled together, the first bead faces against the second plate, and second and third beads face against the first plate, wherein the first bead is located between the second and third beads. When the gasket is tightened, the first, second and third beads form a plurality of corrugated beads at selected areas around the hole to securely and widely seal the same.

8 Claims, 2 Drawing Sheets

STEEL LAMINATE GASKET WITH SEPARATE BEADS

CROSS-REFERENCE TO RELATED APPLICATION

This is a continuation in part of the application of Ser. No. 194,337 filed on May 16, 1988.

BACKGROUND OF THE INVENTION AND RELATED ART STATEMENT

The present invention relates to a steel laminate gasket for an internal combustion engine having two separate beads for providing desired sealing pressure around a hole to be sealed.

The steel laminate gasket of the invention can be used widely, such as a regular gasket situated between two engine blocks, cylinder head gasket and manifold gasket. Further, in the gasket of the present invention, cylinder holes Hc, water holes Hw, oil holes Ho, bolt holes Hb and the like, as shown in FIG. 1 can be easily and securely sealed.

In the steel laminate gasket, one of the very important things when the steel laminate gasket is designed is how portions around holes of the engine are securely sealed. If the portions around the holes of the engine are not properly sealed, the engine does not operate as intended. In this respect, there have been proposed many methods.

One of conventional methods for sealing around holes, such as a cylinder hole Hc, is shown in FIG. 2, wherein a gasket 20 comprises an upper plate 21, a lower plate 24, a middle plate 22, and a middle plate 23 having a bead 23a around a cylinder hole Hc to be sealed. The lower plate 24 is provided with a curved portion 24a located around the hole Hc, and a flange portion 24b situated above the upper plate 21. In the gasket 20, the curved portion 24a together with the bead 23a seals around the hole Hc.

When the gasket 20 is assembled, after the plates are stacked together, the curved portion 24a must be bent. In this respect, in case a hole to be sealed is small, configuration of the hole is complicated or metal quality relative to bending is not good, a curved portion may crack. If a crack is formed on the bending portion, sealing ability of the gasket decreases, and therefore the gasket can not be used any more. Therefore, the bending portion can not be employed for sealing all kinds of holes.

When the curved or bending portion is not used, a gasket 25 as shown in FIG. 3 may be used. The gasket 25 comprises an upper plate 26, a lower plate 28 and a middle plate 27 having a bead 27a around a hole Hc. In this gasket 25, the bead 27a only provides a sealing pressure around the hole Hc. Therefore, fluid passing through the hole Hc may possibly permeate through the plates. The sealing ability of the gasket 25 is not good.

In view of the prior art as stated above, a steel laminate gasket with high sealing ability had been proposed and filed on June 26, 1987, which was patented on July 26, 1988 as U.S. Pat. No. 4,759,585. The gasket is provided with at least two plates with beads respectively, wherein when the gasket is tightened, the beads diagonally push with each other to provide high sealing pressure around a hole.

The gasket of the present invention does not basically provide so high sealing pressure as in the gasket disclosed in U.S. Pat. No. 4,759,585, but the gasket of the invention can provide sufficient sealing pressure and securely seal around a hole to be sealed.

Accordingly, one object of the present invention is to provide a steel laminate gasket, which can provide moderate sealing pressure around a hole and seal securely around the hole.

Another object of the present invention is to provide a steel laminate gasket as stated above, wherein sealing pressure applied around a hole to be sealed can be controlled as desired.

A further object of the present invention is to provide a steel laminate gasket as stated above, which can provide high sealing pressure if desired.

A still further object of the present invention is to provide a steel laminate gasket as stated above, which can be easily and economically manufactured.

Further objects and advantages of the invention will be apparent from the following description of the invention.

SUMMARY OF THE INVENTION

A steel laminate gasket of the invention is designed to be installed in an internal combustion engine having at least one hole therein. The gasket comprises a first plate and a second plate situated adjacent to the first plate. The first plate is provided with at least one first hole therein corresponding to the hole of the engine and a first bead situated adjacent to the first hole to surround the same. The second plate is provided with at least one second hole corresponding to the hole of the engine, at least one second bead situated adjacent to the second hole to surround the same, and at least one third bead situated at a predetermined distance away from the second bead and extending in the same direction as that of the second bead.

When the first and second plates are assembled together, the first bead faces against the second plate and is located between the second and third beads, while the second and third beads face against the first plate. When the gasket is tightened, the first, second and third beads form a plurality of corrugated beads at selected areas around the hole to securely and widely seal around the same.

The second plate may be provided with a curved portion situated inside the first hole for defining the second hole, and a flange situated over the first bead. The surface pressure formed on the first bead may be different from the surface pressure formed on the second and third beads when the gasket is tightened.

DETAILED DESCRIPTION OF PREFERRED EMBODIMENTS

Figure 1:
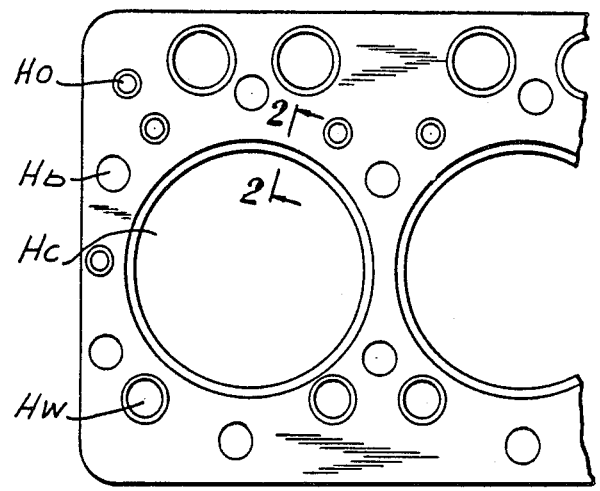
FIG. 1 is a partial plan view of a conventional cylinder head gasket.
Figure 2:
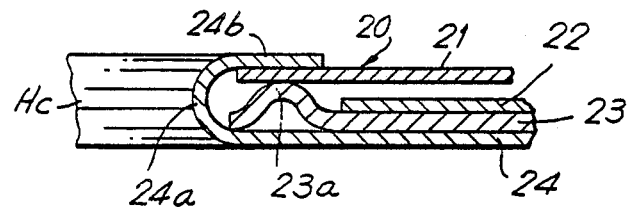
FIG. 2 is an enlarged section view taken along line 2—2 in FIG. 1.
Figure 3:
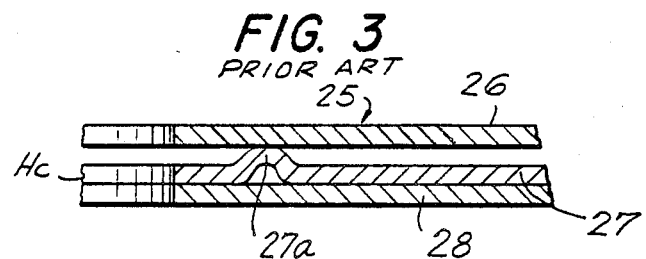
FIG. 3 is a section view, similar to FIG. 2, for showing a different conventional gasket.
Figure 4:
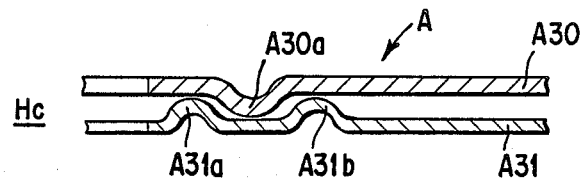
FIG. 4 is an explanatory section view, similar to FIG. 2, of a first embodiment of a steel laminate gasket of the present invention.

Referring to FIG. 4, a first embodiment A of a steel laminate gasket of the invention is shown. The gasket A as shown in FIG. 4 is a cylinder head gasket, similar to FIG. 1, and is provided with a plurality of holes, i.e. cylinder holes Hc, water holes Hw, oil holes Ho and bolt holes Hb. Areas around the cylinder holes Hc, water holes Hw and oil holes Ho are designed to be sealed in accordance with the present invention. For explanation, an area adjacent the cylinder hole Hc is shown as a section view in FIG. 4. The structures around the water holes Hw and oil holes Ho are, except size, the same as the structure as shown in FIG. 4. Therefore, explanation around the water holes Hw and oil holes Ho is eliminated.

The gasket A comprises an upper plate A30 with a bead A30$a$ around a cylinder hole Hc, and a lower plate A31 with beads A31$a$, A31$b$ around the cylinder hole Hc. The distance from the cylinder hole Hc to the center of the bead A30$a$ is substantially the same as the distance from the cylinder hole Hc to the mid point between the beads A31$a$, A31$b$. Therefore, when the plates A30, A31 are assembled, the bead A30$a$ is located between the beads A31$a$, A31$b$.

In the gasket A, the beads A30$a$, A31$a$, A31$b$ do not contact with each other. The sizes of the beads A30$a$, A31$a$, A31$b$ are the same. However, the plate A30 is made thicker than the plate A31.

When the gasket A is situated between a cylinder head and a cylinder block (both not shown) and is tightened, the bead A30$a$ is pushed against the plate A31, while the beads A31$a$, A31$b$ are pushed against the plate A30, so that a plurality of corrugated beads is formed. Accordingly, the area around the cylinder hole Hc is sealed by corrugated beads, which are formed by the beads A30$a$, A31$a$, A31$b$. Since the corrugated beads are spread widely around the cylinder hole Hc, extremely high sealing pressure is not formed or concentrated at one area. Instead, wide sealing pressure is formed around the cylinder hole Hc. Consequently, the area around the cylinder hole Hc can be securely sealed.

In the gasket A, since the plate A30 is thicker than the plate A31, the sealing pressure formed by the bead A30$a$ is stronger than the sealing pressure formed by the beads A31$a$, A31$b$.

The plates A30, A31 are made of the same material. However, the lower plate A31 which has the bead A31$a$ located close to the cylinder hole Hc may be made of a material strong against heat, such as a stainless steel.

Figure 5:
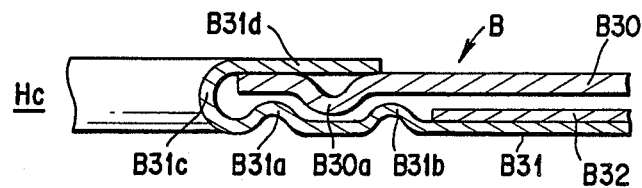
FIGS. 5-7 are section views, similar to FIG. 4, of second to fourth embodiments of the present invention.

FIG. 5 shows a second embodiment B of a steel laminate gasket of the invention. The gasket B comprises an upper plate B30 with a bead B30$a$, and a lower plate B31 with beads B31$a$, B31$b$, similar to the gasket A. However, the lower plate B31 further includes a curved portion B31$c$, and a flange B31$d$ situated over a part of the plate B30, i.e. the bead B30$a$. Further, the gasket B is provided with a surface pressure regulation plate B32 between the plates B30, B31. The tightening pressure applied to the beads may be adjusted by changing the thickness of the plate B32.

In the gasket B, the curved portion B31$c$ seals around the cylinder hole Hc in addition to the beads B30$a$, B31$a$, B31$b$. Therefore, the area around the cylinder hole Hc can be securely sealed.

Figure 6:
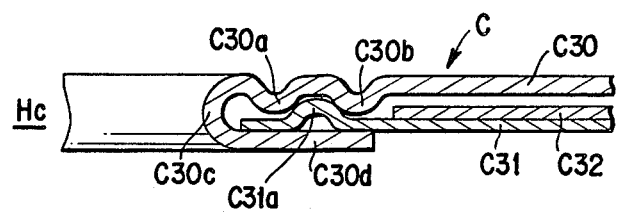

FIG. 6 shows a third embodiment C of a steel laminate gasket of the invention. The gasket C has a structure such that the gasket B is inverted. Namely, the gasket C comprises an upper plate C30 having beads C30$a$, C30$b$, a curved portion C30$c$ and a flange C30$d$, a lower plate C31 with a head C31$a$, and a surface pressure regulation plate C32 situated between the upper and lower plates C30, C31.

In the gasket C, the thickness of the plate C30 is thicker than the plate C31. Also, the distance between the beads C30$a$, C30$b$ is substantially the same as the width of the bead C31$a$. Therefore, when the gasket C is tightened, the beads push with each other and form a plurality of corrugated beads, which partly engage with each other. Therefore, the gasket C can provide a high sealing pressure when tightened.

Figure 7:
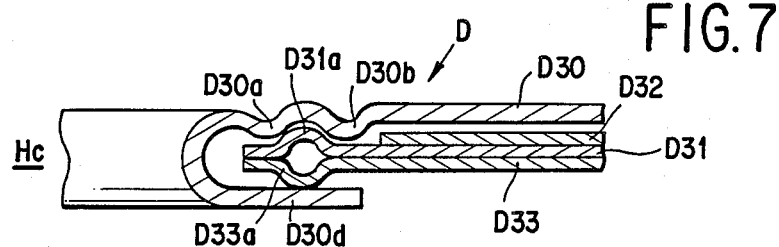

FIG. 7 shows a fourth embodiment D of a steel laminate gasket of the invention. The gasket D comprises an upper plate D30 with beads D30$a$, D30$b$, a lower plate D31 with a bead D31$a$, and a surface pressure regulation plate D32, similar to the gasket C. However, the gasket D further includes an outer plate D33 with a bead D33$a$ situated under the lower plate D31.

In the gasket D, since the outer plate D33 is provided with the bead D33$a$, the gasket D can provide compressibility greater than the gasket C. Therefore, in case a gasket requires great compressibility, such as when a cylinder head is tightened, the cylinder head slightly bends relative to a cylinder block, the gasket D is suitable.

In the present invention, the gasket comprises a first plate having a first bead, and a second plate situated adjacent to the first plate and having second and third beads. The distance from a hole of the engine to the center of the first bead is the same as the distance from the hole to the mid point between the second and third beads. The area around the hole can be sealed by the three beads. The sealing pressure formed by the beads can be determined as desired by changing the hardness and thickness of the metal plates, and the shape of the beads. In the present invention, a desired sealing condition can be formed around a hole to be sealed in view of the characteristics of an engine.

While the invention has been explained with reference to the specific embodiments of the invention, the explanation is illustrative and the invention is limited only by the appended claims.

What is claimed is:

1. A steel laminate gasket for an internal combustion engine having at least one hole therein, comprising:
   a first plate having at least one first hole therein corresponding to the hole of the engine, and a first bead situated adjacent to the first hole to surround the same, and
   a second plate situated adjacent to the first plate and having at least one second hole therein corresponding to the hole of the engine, at least one second bead situated adjacent to the second hole to surround the same, and at least one third bead situated at a predetermined distance away from the second bead and extending in the same direction as that of the second bead, said first bead facing against the second plate and being located between the second and third beads and the second and third beads facing against the first plate when the first and second plates are assembled together, said first, second and third beads respectively forming a plurality of corrugated beads to securely and widely seal around the hole when the gasket is tightened, wherein surface pressure formed on the first bead is different from that of the second and third beads.

2. A steel laminate gasket according to claim 1, wherein the thickness of the first plate is different from that of the second plate so that the surface pressure formed on the beads is different.

3. A steel laminate gasket for an internal combustion engine having at least one hole therein, comprising:
    a first plate having at least one first hole therein corresponding to the hole of the engine, and a first bead situated adjacent to the first hole to surround the same, and
    a second plate situated adjacent to the first plate and having at least one second hole therein corresponding to the hole of the engine, at least one second bead situated adjacent to the second hole to surround the same, and at least one third bead situated at a predetermined distance away from the second bead and extending in the same direction as that of the second bead, said first bead facing against the second plate and being located between the second and third beads and the second and third beads facing against the first plate when the first and second plates are assembled together, said second plate further including a curved portion situated inside the first hole for defining the second hole and a flange situated over the first bead, said first, second and third beads respectively forming a plurality of corrugated beads to securely and widely seal around the hole when the gasket is tightened.

4. A steel laminate gasket according to claim 3, wherein surface pressure formed on the first bead is different from the surface pressure formed on the second and third beads when the gasket is tightened.

5. A steel laminate gasket according to claim 4, wherein the thickness of the first plate is different from that of the second plate to provide different surface pressure on the first, second and third beads.

6. A steel laminate gasket according to claim 5, further comprising a third plate having a third hole with a diameter larger than the diameter of the third bead, said third plate being situated between the first and second plates so that the first, second and third beads are located inside the third hole, said third plate operating as a surface pressure regulation plate for the first, second and third beads.

7. A steel laminate gasket according to claim 6, wherein the distance between the second and third beads is substantially the same as the width of the first bead so that when the gasket is tightened, the first bead pushes against the second and third beads to thereby provide strong sealing pressure thereat.

8. A steel laminate gasket according to claim 6, further comprising a fourth plate situated substantially over the first plate, said fourth plate including a fourth hole having a size substantially the same as that of the first hole, and a fourth bead extending in the direction opposite to the first bead, said fourth bead being located between the first plate and the flange of the second plate.

* * * * *